Figure 1:
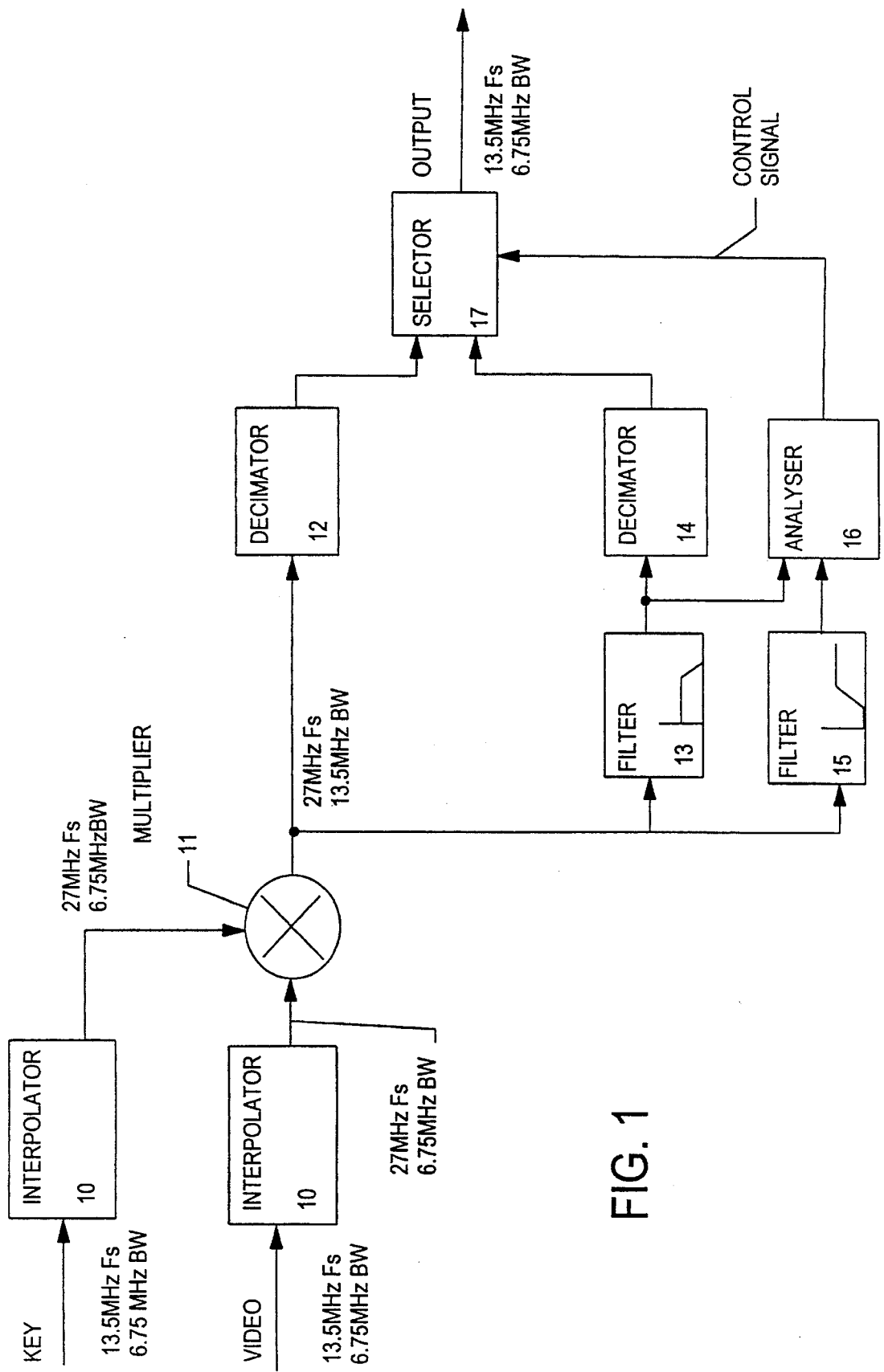

United States Patent

Robinson et al.

[11] Patent Number: 5,623,317
[45] Date of Patent: Apr. 22, 1997

[54] ALIAS DETECTION AND AVOIDANCE PROCESS USED IN THE PROCESSING OF VIDEO SIGNALS

[76] Inventors: Roger Robinson; Alan Cosgrove; David Leftley; Wynn Rees, all of c/o Vistek Electronics Ltd., Unit C, Wessex Road, Bourne End, Buckinghamshire SL8 5DT, United Kingdom

[21] Appl. No.: 371,705

[22] Filed: Jan. 12, 1995

[30] Foreign Application Priority Data

Jan. 12, 1994 [GB] United Kingdom .................... 9400438

[51] Int. Cl.$^6$ .................................................... H04N 5/265
[52] U.S. Cl. ............................................ 348/584; 348/590
[58] Field of Search .................................... 348/584–587, 348/588–600, 563–570; H04N 5/262, 5/265, 5/272, 5/275, 5/278, 5/21, 9/74, 9/75, 9/76

[56] References Cited

U.S. PATENT DOCUMENTS 4,979,022  12/1990  Snashall et al. ...................... 348/584
5,181,100  1/1993  Hodgson ............................... 348/607

FOREIGN PATENT DOCUMENTS 0360509  3/1990  European Pat. Off. .
0360557  3/1990  European Pat. Off. ......... H04N 9/75

OTHER PUBLICATIONS

Sandbank C.P. "Digital Television" pp. IV–XI and 287–311, 1990 John Wiley & Sons Ltd.

*Primary Examiner*—David E. Harvey
*Attorney, Agent, or Firm*—Lowe, Price, LeBlanc & Becker

[57] ABSTRACT

A method and apparatus for combining video signals with key signals whilst maintaining the integrity of the video signal and minimizing the effect of alias components. An analyser detects whether there are any high frequency components which would otherwise cause alias components. If such high frequency components are present, then low-pass filtering occurs. If such high frequency components are not present, then no unnecessary filtering occurs so as to maintain the absolute integrity of the video signal.

5 Claims, 3 Drawing Sheets

5,623,317

ALIAS DETECTION AND AVOIDANCE PROCESS USED IN THE PROCESSING OF VIDEO SIGNALS

INTRODUCTION

The present invention relates to a method and apparatus for combining video with key signals without violating the limitation set by the normal sampling frequency (typically 13.5 MHz) and without degrading the video image.

In a digital television system the video is sampled in time by a digital sampling clock to produce a series of digital values representing the video at points in time defined by the sampling clock. In order to accurately represent the video signal the frequency of the sampling clock Fs must be at least twice the highest frequency contained within the video signal which may extend over the frequency range zero to Fv, thus the minimum value of Fs is defined by Fs>2Fv. Conventionally a sampling frequency in digital television processing is 13.5 MHz which is used to sample video signals with a bandwidth extending to 5.75 MHz with minimal energy over 6.75 MHz.

In a video mixer the video signal may be modified by a time varying key signal. In a digital implementation of a video mixer the key signal is sampled by a sampling clock and may convey information in a defined frequency range zero to a maximum frequency Fk. When the video signal is modified by multiplication with a key signal; if the video signal contains spectral components in the range zero to Fv and the key signal contains frequency components zero to Fk, then the resultant spectrum of the signal after multiplication will contain frequency components in the range zero to Fv+Fk. For this to accurately represent the required processed video signal the sum of Fv+Fk must now be less than one half of the sampling frequency i.e. Fs>2(Fv+Fk). If this condition is not met unwanted frequency components known as alias components will be generated within the frequency range Fs-(Fv+Fk) to Fs/2.

Typically both the video and key signals are upsampled to at least 2Fs by interpolating intermediate digital samples from the values of at least adjacent digital samples in the data stream prior to modification by multiplication, thus avoiding alias components being generated. However when this new stream with a zero to (Fv+Fk) frequency range is downsampled to a sampling frequency of Fs, alias components may be generated. This is typically overcome by low-pass filtering prior to downsampling the signal. Downsampling to Fs is implemented by decimating digital samples in the data stream. For downsampling 2Fs to Fs every other sample in the data stream is removed.

The present invention aims to overcome this problem in a unique manner. Thus the present invention relates to a method of detecting when high frequency components in excess of half of the output sampling frequency have been generated, these frequency components would generate alias components if the signal were simply downsampled. According to the present invention a signal analyser is used to detect the presence of such high frequency components. When such components are detected a low pass filter is introduced prior to downsampling. However when no high frequency components are detected then unnecessary filtering of the signal can be avoided and absolute integrity of the input video signal can be maintained.

PRIOR ART

EP Patent Publication No. 0 360 557 in the name of Abekas Video Systems Ltd. describes an alternative method for keying a digital video signal. The present invention is superior and different to the Abekas method in the following ways:

1. The prior art analyses the key signal only. This relies on sensing the presence of high frequency key signals in the range zero to 6 MHz. This method is flawed when the video signal contains high frequency signals because the product of video and key will exceed 6.75 MHz and therefore causing aliasing. This could be overcome moving the key sensing threshold down to lower frequencies, but this would suffer from degradation of the video signal due to the filter being switched in unnecessarily when the combined video and key signals are below 6.75 MHz. The present invention overcomes the above limitations by analysing the combined video and key signal which detects the presence of unwanted alias frequency components.

2. According to the present invention hysteresis may be added to the control signal. This is done to make sure that when the switch occurs, it takes place at a clean undisturbed point in both signals thus making the switch appear transparent. In contrast, the Abekas method does not offer such a mechanism, and the switch could occur between one or even two degraded or aliased signals and therefore not appear transparent.

INTRODUCTION OF THE DRAWINGS

Figure 2A:
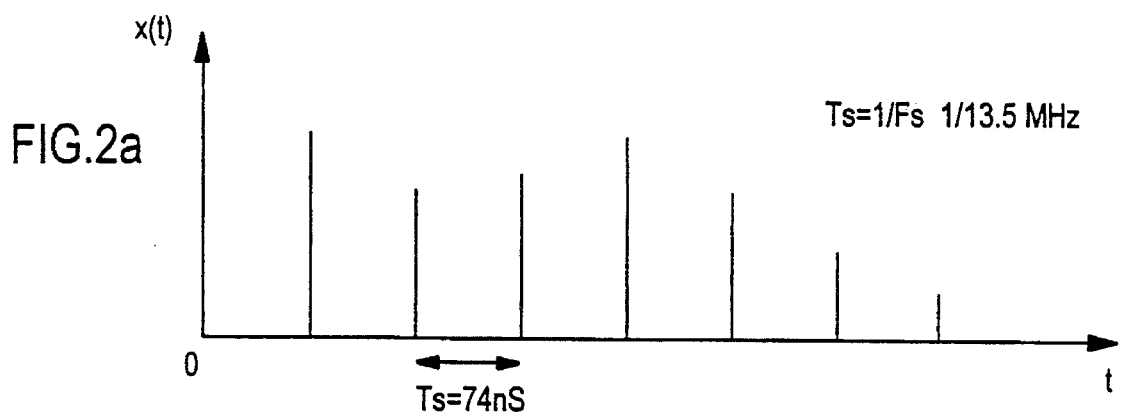
Figure 2B:
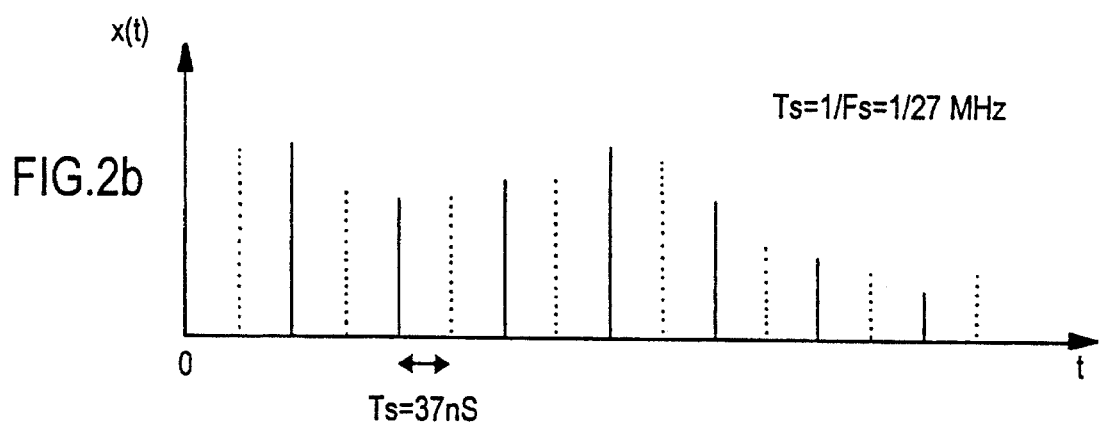
Figure 2C:
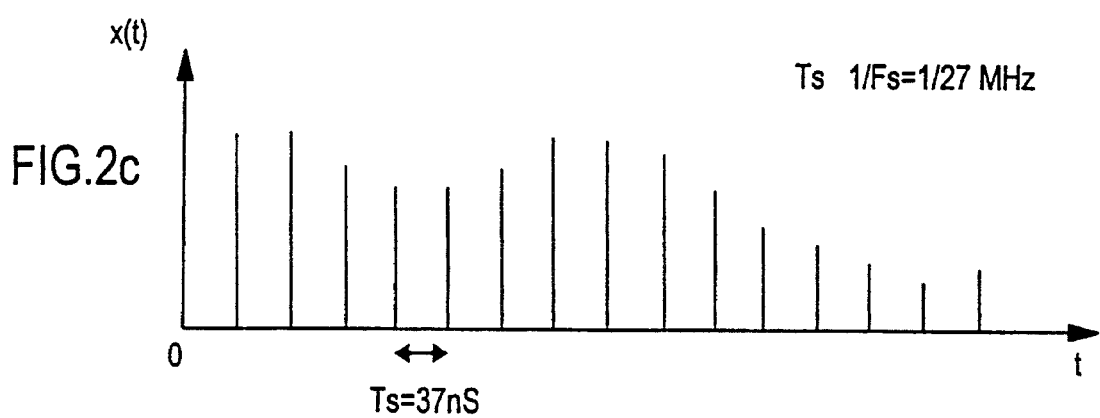

The present invention will be described with reference to a preferred embodiment which is illustrated in the accompanying drawings, of which:

FIG. 1 is a schematic circuit diagram of the present invention;

FIGS. 2(a)–(c) illustrate a time domain representation of a video signal (2a) which is upsampled (2b) and the corresponding key signal (2c); and FIGS. 3(a)–(d) illustrate a frequency domain representation of a video signal (3a) which is upsampled (3b), the corresponding key signal (3c) and the combined video and key signal (3d).

The description relates to a sampling frequency of 13.5 MHz which is upsampled to 27 MHz. These frequencies are conventionally used for video processing but other sampling frequencies could be used. For example in the case of CCIR601, chrominance has a sampling frequency of 6.75 MHz which might be upsampled to 13.5 MHz. It is also worth noting at this point that is not always necessary to upsample the incoming signal provided that Fs>4Fv or Fs×4Fk at the input.

DESCRIPTION

The video input signal, consisting of a series of digital samples at a sample rate of 13.5 MHz and representing a video signal with a bandwidth of 5.75 MHz is shown in FIG. 2a. The frequency spectrum of this signal, shown in FIG. 3a, consists of a baseband spectrum extending to 5.75 MHz plus a series of repeat spectra centred on harmonics of the sampling frequency.

Figure 3A:
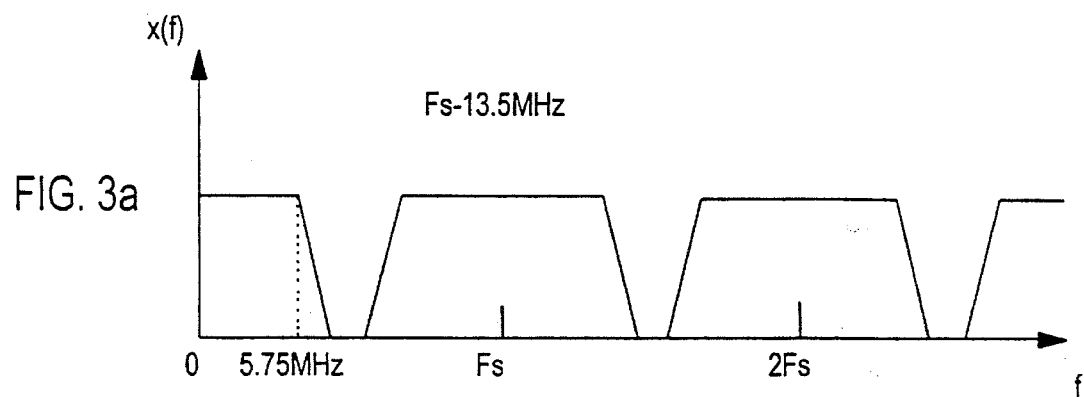
Figure 3B:
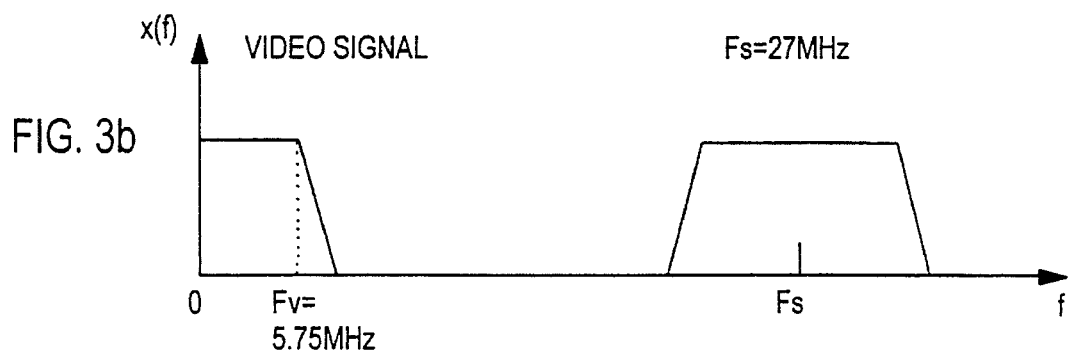
Figure 3C:
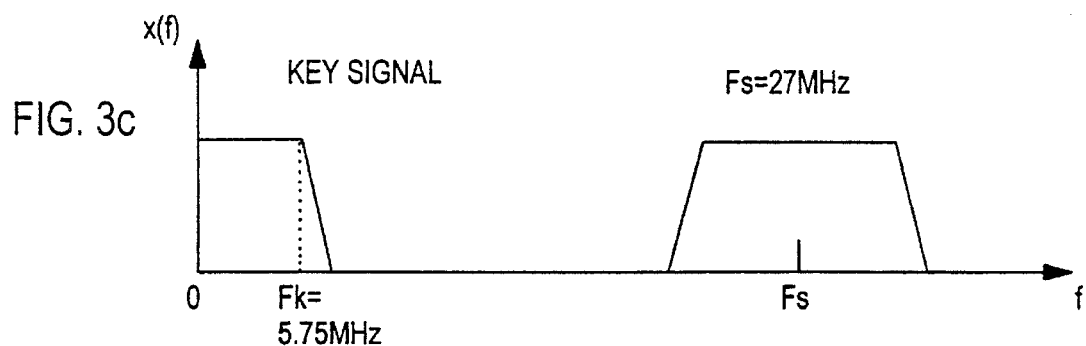
Figure 3D:
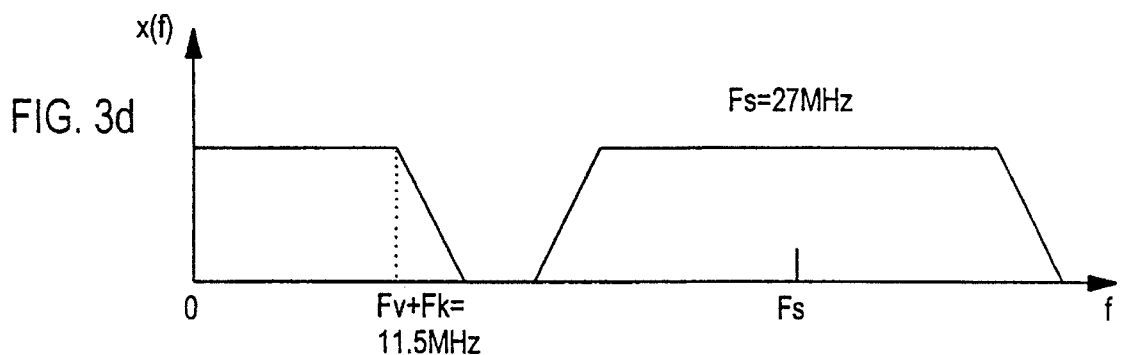

With reference to FIG. 1, this video input signal is supplied to an interpolator or upsampler 10. The upsampler 10 increases the sampling frequency of the video signal to a second sampling frequency of 27 MHz. This upsampling is accomplished by interpolating the video data to generate new intermediate samples between the existing original samples, as shown in FIG. 2b. The corresponding frequency spectrum of the upsampled signal is shown in FIG. 3b. This ideally consists of the original based signal spectrum with the repeat spectra moved up in frequency to harmonics of the second sampling frequency, i.e. 27 MHz.

The upsampler 10 interpolates the value, x, of an intermediate sample between two adjacent samples with values c and d respectively, can be simply calculated using the formula: x–(c+d)/2. However higher accuracy can be achieved by using more than just the two adjacent samples. An example of such a formula using six consecutive samples with values a,b,c,d,e,f, to generate an intermediate sample, x, between samples c and d is:

$$x-0.0625a-0.125b+0.625c+0.625d-0.125e+0.0625f$$

Further details of techniques for interpolating video data are described in C. P. Sandbank, (1990) Digital Television, John Wiley, Chichester England.

The upsampled data stream is thus arranged to consist of original samples with interposed interpolated samples.

The key input signal is again a series of digital samples at a sample rate of 27 MHz, representing a key signal with a spectrum which may extend to 5.75 MHz. This signal is shown in FIG. 2c, and its frequency spectrum is shown in FIG. 3 c. This key signal may have been generated by upsampling a key signal which was previously sampled at 13.5 MHz in a similar way to the video input signal, or it may have been generated in an electronic pattern generator.

Keying of the video signal is accomplished by multiplying the samples of the upsampled video signal by the corresponding samples of the key signal in a multiplier 11. This multiplication of the video and key signals in the time-domain produces a signal at the output of the multiplier 11 which has a frequency spectrum which is equivalent to that produced by mathematically convolving the spectrum of the upsampled video signal with that of the key signal. This spectrum is shown diagramatically in FIG. 3d, and consists of a baseband spectrum which extends to a maximum frequency equal to the sum of maximum frequency of the video signal, Fv, and the maximum frequency of the key signal, Fk, and also repeat spectra centred on harmonics of the second sampling frequency.

The output of multiplier 11 is processed in three different ways:

1. A decimator 12 removes the interpolated samples to provide a 13.5 MHz signal. This is done in such a way that samples derived from interpolated values are removed leaving the samples derived from the non-interpolated input video and key samples. This provides a path with no degradation to the original video signal: provided there is no modification by the key signal. When a key signal acts on the video signal, the bandwidth may exceed 6.75 MHz and cause aliasing after decimation.

2. A low pass filter 13 limits the bandwidth to 6.75 MHz. Then a further decimator 14 removes samples to provide a 13.5 MHz signal which, due to pre-filtering in filter 13 is essentially free from alias components. There will be some degradation to the original video signal due to the limitations in the filter 13.

3. A filter 15 passes signals above one half the output sampling frequency. An analyser 16 is connected to the output of filters 13 and 15 and detects the presence of frequency components above one half the output sampling frequency to produce a control signal which controls a selector 17. When such high frequency signals are detected by the analyser 16, the output of decimator 14 is selected to provide the output. Otherwise, in the absence of such high frequency signals, the signal from decimator 12 is used to provide the output. Hysteresis may be added to the control signal from the analyser 16 to minimise unnecessary switching. As an alternative, a proportion of the two signals from the decimators 12 and 14 may be combined depending on the output from analyser 16 such that when a high level of output is produced from filter 15, the majority of the output is derived from filter 13 via decimator 14.

The above ensures that there is no deterioration in the video signal when there is no key signal acting on it, or when the combined spectrum of the key and video signals are such that aliasing will not occur.

Information will only be removed from the video signal by low pass filtering in the case the signal would contain significant alias components when sampled at the output data rate of 13.5 MHz.

The aforegoing description has been given by way of example only and it will be appreciated by a person skilled in the art that modifications can be made without departing from the scope of the present invention.

For example the presence of the high frequency components may be detected by a low pass filter and a rectification means. The selector 17, may comprise a variable combining circuit.

We claim:

1. A circuit for mixing a video signal Fv and a key signal Fk comprising:

an interpolator for receiving and upsampling the video signal Fv;

a multiplier for receiving the key signal Fk and multiplying it with the upsampled video signal to provide an upsampled keyed video signal.

a first downsampler for downsampling the upsampled keyed video signal;

a low pass filter for filtering the upsampled keyed video signal;

a second downsampler for downsampling the filtered signal; and means for detecting the presence of high frequency components in the upsampled keyed video signal to provide a control signal for switching between outputs of the first and second downsampler.

2. A circuit as claimed in claim 1 in which said detecting means comprises a high pass filter and an analyser.

3. A circuit as claimed in claim 2, in which said analyser includes means for introducing hysteresis in the control signal.

4. A circuit as claimed in claim 1 further comprising a switch for receiving the control signal and switching between the outputs of the first and second downsampler.

5. A method of mixing a video signal Fv and a key signal Fk comprising the steps of:

upsampling the video signal Fv;

multiplying the upsampled video signal and the key signal to provide an upsampled keyed video output;

downsampling the keyed video output;

low pass filtering the keyed video output;

downsampling the filtered output;

detecting high frequency components in the keyed video output; and switching between the downsampled keyed video output and the downsampled filtered output.

* * * * *